United States Patent [19]

Beech et al.

[11] Patent Number: 4,564,976
[45] Date of Patent: Jan. 21, 1986

[54] APPARATUS FOR PROCESSING POULTRY BREASTS

[75] Inventors: Jeffrey A. Beech, Tucker; John N. Penprase, Marietta, both of Ga.

[73] Assignee: Pritchard Sales Company, Inc., Atlanta, Ga.

[21] Appl. No.: 598,182

[22] Filed: Apr. 9, 1984

[51] Int. Cl.⁴ ............................................ A22C 21/100
[52] U.S. Cl. ............................................ 17/11; 17/46
[58] Field of Search ................ 17/11, 52, 56, 63, 46; 83/102.1, 121, 162, 163, 425.1, 425.2

[56] References Cited

U.S. PATENT DOCUMENTS

| | | | |
|---|---|---|---|
| 3,760,665 | 9/1973 | Vadas | 83/425.1 |
| 4,363,251 | 12/1982 | Carlson | 83/425.2 |
| 4,424,608 | 1/1984 | Martin | 17/52 |

Primary Examiner—Robert L. Spruill
Assistant Examiner—Richard M. Mudd
Attorney, Agent, or Firm—Thomas & Kennedy

[57] ABSTRACT

Apparatus for cutting poultry breasts into segments and for distributing the segments to independent collection sites has a separator plate 60 extending from a breast cutting station 42 through a back cutting station 43 to a dump station 69 along an upright cutting plane straddled by a pair of endless conveyors 12.

2 Claims, 5 Drawing Figures

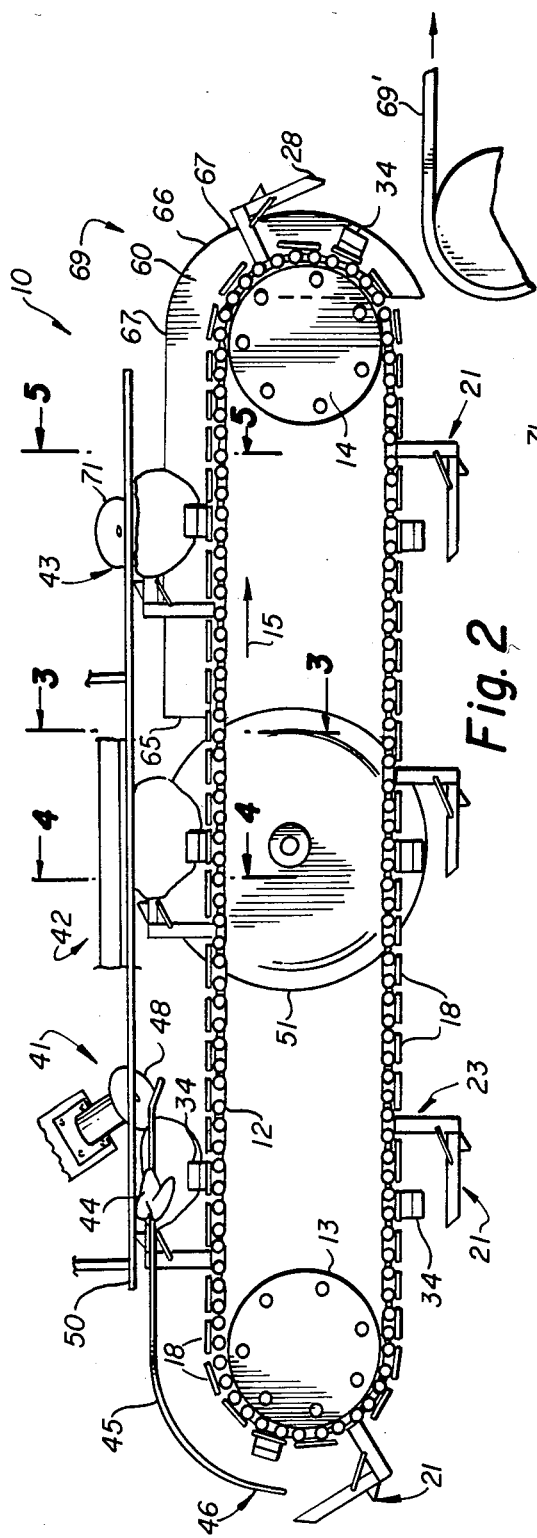
Fig. 2
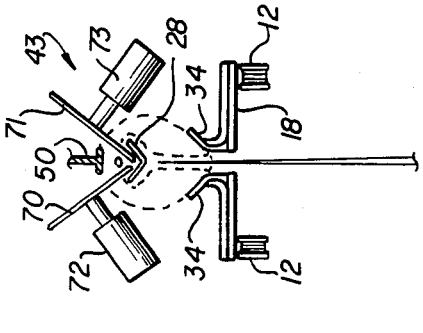
Fig. 5
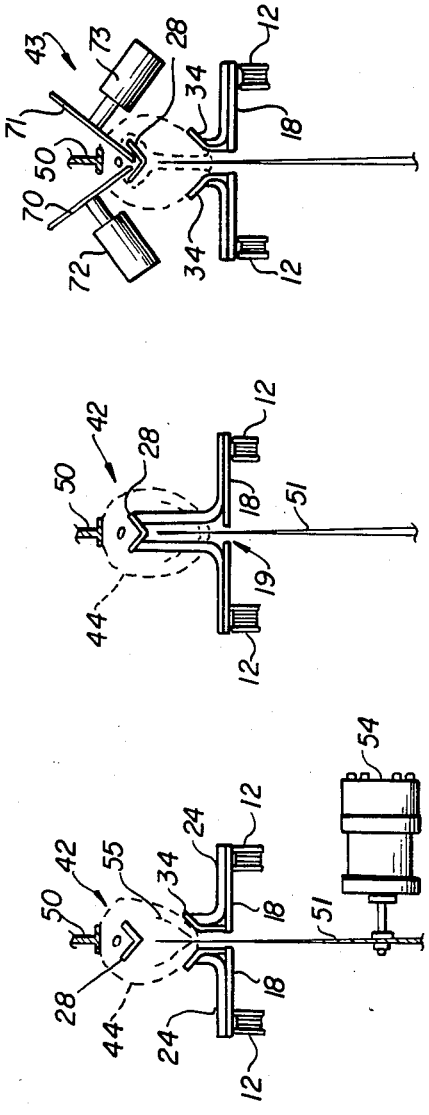
Fig. 4
Fig. 3

APPARATUS FOR PROCESSING POULTRY BREASTS

TECHNICAL FIELD

This invention relates to apparatus for processing poultry, and particularly to apparatus for segmenting breasts and distributing the breast segments.

BACKGROUND OF THE INVENTION

In the commercial processing of poultry, birds are killed, defeathered, eviscerated, and often cut into parts or segments such as by separating the wings, legs and breast. Various cutting devices have been developed and utilized for performing the cutting functions. The cutting devices used to cut the wings and legs from the remainder of the carcass, that is the breast and back, are relatively simple in construction and reliable in operation because these poultry parts protrude from the carcass and can be guided by automated equipment so as to position them in a proper attitude for cutting. When cutting the carcass or body of a bird itself, however, it is more difficult to form an accurate cut with automated equipment. The differences in sizes and shapes of poultry carcasses cause them to be difficult to orient in an automated manner. One procedure for orienting a poultry carcass is to mount the cavity of the carcass on a carrier and move the carcass-loaded carrier along a predetermined path through a series of cutting stations where rotary cutting blades cut into the carcass. Even with this type procedure, however, the poultry carcasses tend to move on the carrier thereby necessitating the use of various guides to maintain them in a proper position.

Recently, automated poultry breast processing machines have been devised which have overcome the just described problems of forming breast cuts. These machines are exemplified by those disclosed in U.S Pat. No. 4,424,608 and in U.S. patent application Ser. No. 476,799, now U.S. Pat. No. 4,536,919, which application is assigned to the assignee of the present invention. These machines have a pair of endless conveyors to which carcass support carriers are mounted. The two conveyors straddle a cutting plane in which a cutting disc is rotatably mounted for forming a longitudinal cut in that part of the breast portion which depends from the support. The machines also have other rotating discs located downline from the first disc for forming a cut in the carcass backbone which is carried above the carcass support. After a carcass has passed both cutting stations it will have been severed into two bilateral halves which are then carried by the conveyor to a dump station.

Though the just described machinery has satisfactorily cut poultry breasts into severed segments or halves, it has not satisfactorily distributed them. Specifically, it has not been capable of consistently delivering left-side breast halves to one collection site and right-side breast halves to another collection site. Because of the slippery conditions of the machinery and because of the close proximity of the halves of the cut-apart breast, the breast halves often become intermingled despite the presence of both upper and lower carcass supports. Thus, right-sides have tended to be deposited along with left-sides at a left-half collection site and left-sides sometimes deposited in a right-half collection site.

After the birds have been cut into various segments they are conveyed away from the cut up machinery for packaging. Different packaging schemes call for different groupings of poultry pieces. In some cases, for example, the segments of one complete bird are placed into one package. In other cases, bird halves are packaged. In these latter cases the packages are conformed to receive one bilateral half, for example, the segments of a right half of a single bird, while other packages are conformed to hold the other bilateral half. To perform such packaging, which is usually done manually, it obviously would be far more efficient if preselected segments were consistently delivered from the cut up machine, i.e. right-side segments reliably delivered to one packaging station and left-side segments delivered to another. For example, where two conveyors extend from two delivery sites located beneath a delivery station of a cut-up machine, it would be desirable to have segments cut from one side of each carcass consistently delivered onto one conveyor and segments cut from the other side of the carcass consistently delivered to the other conveyor. This would avoid workers who perform the packaging operation from having to check the various cuts and from having to make corrections where erroneous deliveries have been made. It thus would be desirable to provide an automated apparatus which could do this. It is to the provision of such that the present invention is therefore primarily directed.

SUMMARY OF THE INVENTION

Briefly described, the present invention comprises apparatus for successively severing poultry breasts longitudinally into halves and for distributing the severed breast halves to separate delivery sites. The apparatus includes a plurality of support mandrels for projecting into the previously eviscerated cavity of a bird for successively conveying poultry carcasses along a generally horizontal path with its back resting on the mandrel and the breast suspended beneath the mandrel. The apparatus also has first rotatable disc blade means for cutting each breast below the mandrel into halves and second rotatable disc blade means for cutting the back and thereby separating the breast havles. The apparatus further includes an upright stationary separator plate extending in the same plane as the first disc blade and adjacent the first blade and exending beneath the second disc blade means to a position between the two delivery sites. The separator plate forms a physical separation between the breast halves and requires the breast halves to be delivered to their respective delivery sites.

The mandrels are bifurcated and a pair of slat conveyors arranged in side-by-side relationship carry the mandrels, and the first rotatable blade and the separator plate are supported from beneath and extend up through the slat conveyors and the mandrels straddle the blade and separator plate as the mandrels carry the poultry carcasses through the apparatus.

Thus, it is an object of this invention to provide apparatus for processing poultry whereby the breast of a previously eviscerated bird is cut in half and the cut halves are physically separated and carried to separate delivery sites.

Another object of this invention is to provide an automatic breast cut-up machine which reliably cuts the breast of a bird in half and carries each half to a separate delivery site.

Other objects, features and advantages of the invention will become more apparent upon reading the fol-

BRIEF DESCRIPTION OF THE DRAWING

FIG. 2 is a schematic illustration of the poultry cutting apparatus showing birds being successively cut into segments.

FIG. 3 is an end elevational view of the apparatus shown in FIG. 2 taken along plane 3—3 of FIG. 2.

FIG. 4 is an end elevational view of the apparatus shown in FIG. 2 taken along plane 4—4 of FIG. 2.

FIG. 5 is an end elevational view of the apparatus shown in FIG. 2 taken along plane 5—5 of FIG. 2.

DETAILED DESCRIPTION

Figure 1:
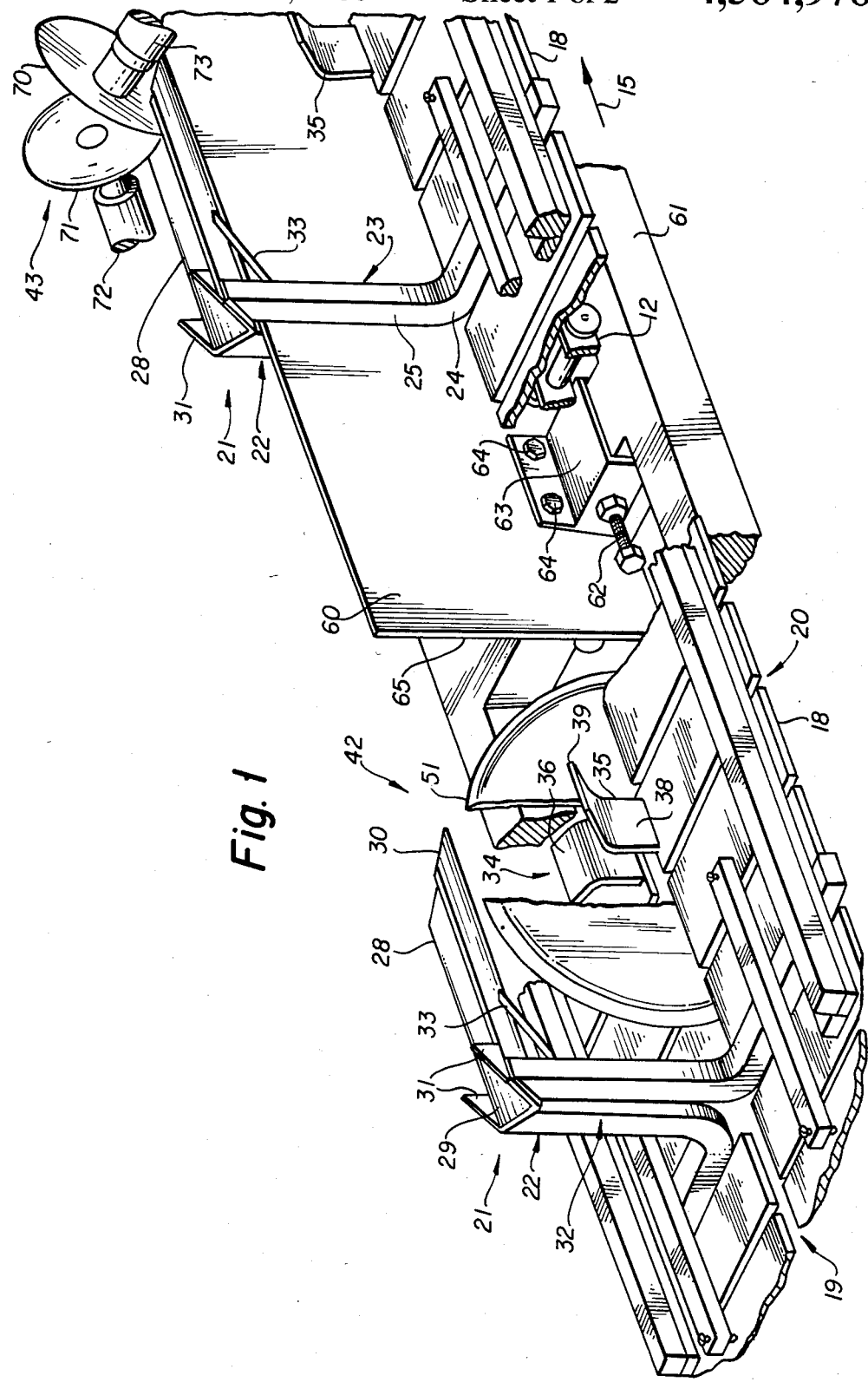
FIG. 1 is a perspective view of a portion of poultry cutting apparatus that embodies principles of the present invention.

Referring now in more detail to the drawing, in which like numerals indicate like parts throughout the several views, FIG. 2 illustrates apparatus 10 for cutting poultry into segments which comprises a pair of conveyor chains 12 mounted in parallel, juxtaposed relation for movement along two endless paths in two parallel upright planes passing over a first pair of side-by-side sprockets 13 and a second pair of side-by-side sprockets 14. The upper flight of the conveyor moves in the direction indicated by arrow 15 when driven by unshown motor means. A plurality of conveyor plates or tracks 18 are mounted to the conveyor chains with each conveyor plate being mounted to one chain link. The conveyor plates are approximately rectangular with the plates on one of the chains being spaced from the plates on the other chain so as to form a longitudinal opening 19 therebetween. Lateral slots or gaps 20 are also located between adjacent plates on each of the conveyor chains.

A plurality of upper poultry carcass supports or mandrels 21 are mounted at intervals along the pair of conveyors 12. Each upper carcass support comprises a pair of L-shaped support brackets 22 and 23, each of which includes a horizontal leg 24 and a vertical leg 25. The horizontal legs 24 are positioned in a lateral slot 20 between adjacent conveyor plates 18 and rigidly mounted to the upper surface of links of the conveyor chains. The vertical legs 23 of each L-shaped bracket straddle the longitudinal opening 19. A V-shaped carcass back support bar 28 is mounted at its base end 29 to the upper ends of the vertical legs 25 of each pair of support brackets with its distal end 30 extending as a cantilever in the direction of movement of the conveyor, as indicated by arrow 15. The carcass backbone support bar 28 is V-shaped in cross-section and includes a pair of positioning tabs 31 mounted to its side surfaces and projecting upwardly therefrom. Support braces 33 extend from each L-shaped support bracket to the lower side surface of the support bar 28. With this construction the carcass supports 21 are bifurcated and a rigid connection is made between some of the links of the parallel conveyor chains 12 through the carcass supports 21 with the carcass supports each defining an upwardly extending space 32 above the longitudinal opening 19.

A lower carcass support bracket 34 is located adjacent and beneath each of the upper carcass support bars 28. The lower carcass support brackets 34 each comprise a pair of bracket plates 35 and 36 having a lower end portion 38 rigidly attached to the upper surface of a conveyor plate 18 and an upper end portion 39 which diverges upwardly and outwardly away from the opposite bracket support plate so that the upper end portions of each breast support bracket 34 form downwardly and inwardly converging surfaces for receiving the bottom portion of a breast of a poultry carcass whose back is mounted atop the upper carcass support bar 28. The bracket plates 35 and 36 also straddle the longitudinal slot 19 of the conveyor and form an upwardly extending space therebetween.

As best illustrated in FIG. 2 the apparatus includes a series of work stations, namely a wing-cutting station 41, a breast-cutting station 42, and a back-cutting station 43. Poultry carcasses 44 are mounted on the upper carcass supports 21 at a loading station 46 adjacent sprockets 13 so that as the carcasses are moved by the conveyor through the cutting stations they will be cut into segments. Because of the curvature of the conveyor assembly about the sprockets 13 at the loading station 46, the distal end 30 of the carcass support bar 28 is spread away from its breast support bracket 34 so that the breast support bracket is not likely to interfere with the mounting of the carcass on a carcass support. However, when a carcass support 21 is moved on or about the sprockets and reaches the upper flight of the conveyor assembly the distal end of the carcass support bar and the downwardly facing breast of the bird is moved towards the lower support bracket 34. Then the weight of the carcass tends to be supported both by the upper carcass support bar and the lower carcass support bracket.

A worker mounts a carcass on an upper carcass support 21 by inserting a cavity of an eviscerated bird about the V-shaped upper carcass support bar 28 and then moving the carcass on the bar 28 until the carcass is prevented from moving further on the bar by the tabs 31. The worker places the wings outside of two wing guide bars 45 that extend from the loading station 46 to the wing-cutting station 41. As the carcass is moved by the conveyor the guide bars 45 spread the wings apart from the carcass body so that the wings are in a proper orientation for being cut from the carcass as the carcass approaches the wing-cutting station 41.

Another guide rod 50 extends parallel to the upper flight of the conveyor assembly and is arranged to slidably engage the upper surfaces of the back of each carcass 44 as they are moved through the cutting stations 41, 42 and 43. This engagement tends to urge each bird downwardly so that the back is seated on the upper carcass support bar 28 and the bottom of the breast is seated in the lower support brackets 34. A pair of rotatable, wing-cutting discs 48 is supported in wing-cutting station 41 with the discs being located on opposite sides of the path of carcass travel and at the end of wing guide bars 45. The cutting discs are arranged to cut at the joint between the wings and the main body of the carcass.

After the wings have been removed from the remainder of the carcass the carcass is transported by the conveyor to the breast-cutting station 42. A rotatable, breast-cutting disc 51 is located within the opening or gap 19 between the pair of conveyors downline from the wing-cutting station 41 with its upper portion protruding upwardly towards but just short of the V-shaped carcass back support bar 28. As a carcass 44 is carried by the carcass support 21 over the breast-cutting disc 51 the disc makes a longitudinal cut at the apex of the keel 55 as shown in FIGS. 2, 3 and 4. During this time the breast support bracket 34 stabilizes the carcass so that the cutting disc does not tend to glance off the keel and make an improper cut. As the carcass is carried over the blade the breast support bracket 34 straddles the blade and tends to prevent the breast from moving laterally outward.

Immediately after leaving the breast-cutting disc 51 the carcass is carried by the carcass support 21 over an upright separator plate 60 mounted to an apparatus frame member 61 by means of two coaxial clamp screws 62 which are threadedly received in a U-shaped channel member 63 that is rigidly mounted by bolts 64 to the separator plate. As best shown in FIG. 2, the upright separator plate extends from a vertical end 65 located closely adjacent the cutting disc 51 to an arcuate end 66 located at a delivery station 69 with the extreme end 67 of the plate located above and just beyond conveyor chains 12 as they turn downwardly in passing over sprockets 14. The top edge 67 of the separator plate is located at a height just beneath the V-shaped element 28 of the carcass support 21 and also at the highest point of the cutting disc 51. With the presence of the separator plate 60, carcasses leaving the breast-cutting station 42 have their cut breast segments held apart by the separator plate while the brackets 34 prevent the breast halves from moving laterally away from the plate.

Next the carcass is carried through the back-cutting station 43 with the back supported atop the upper carcass support 21 from which the two cut breast halves downwardly depend along opposite sides of the separator plate 60. At the back-cutting station 43 the back is completely severed from each of the breast halves by means of two rotatable cutting blades 70 and 71 which are rotatably driven by motors 72 and 73, respectively, along oppositely inclined planes with the lowermost portions of the blades being located closely adjacent to and within the bounds of the V-shape back support element 28 of the upper carcass support. Alternatively, a single blade may be used in lieu of the two blades in which event the single blade is positioned in the upright cutting plane of the breast-cutting disc 51 so as to cut the back into two halves, making a cut through the backbone, thereby leaving the two back halves joined with the previously segmented two breast halves, respectively. Thus, when the two-blade arrangement is used as shown in FIG. 5 a unitary back is cut away from two breast halves thereby disjoining them, whereas when a single blade is used the carcass is cut into two halves each having a back half joined with a breast half.

Where the whole back is cut away from the breast the back is transported atop the V-shaped element 28 to the delivery station where it is removed from the element 28 as it descends. Meanwhile, the breast halves also are transported by the conveyors to the delivery station while being held completely separated by the separator plate but held in their original postions by brackets 34. At the delivery station 69 each breast half falls from its bracket 34 as the bracket rounds the sprocket 14, whereupon the breasts halves gravitate downwardly into separated collection sites 69' located side-by-side. One such site is schematically illustrated as a conveyor belt 69' in FIG. 2 which is shown closer than it actually is to the conveyor 12 for conservation of illustration space. The back also falls into a collection site located between the breast collection sites but somewhat further out from the apparatus. At these three sites are located collection bins or ancillary conveyors such as that shown as conveyor 69.

It thus is seen that an apparatus is provided for cutting poultry carcasses into severed segments and for distributing the segments to independent collection sites. It should, however, be understood that the just described embodiment merely illustrates principles of the invention in one preferred form. Many modifications, additions and deletions other than those specifically suggested may, of course, be made thereto without departure from the spirit and scope of the invention as set forth in the following claims.

We claim:

1. An apparatus for successively severing poultry carcasses longitudinally into halves comprising conveyor means including a pair of conveyors mounted in spaced, side-by-side relationship for movement in unison along parallel paths that straddle an upright plane and which pass in sequence through a carcass loading station, a breast cutting station, a back cutting station and a delivery station, a rotary breast cutting disc positioned at said breast cutting station and protruding upwardly between said pair of conveyors and located in said upright plane, said conveyor means further including a plurality of poultry carcass mandrels mounted at intervals along and extending upwardly from said conveyors, said mandrels each being bifurcated and straddling said plane and movable over said rotary breast cutting disc, back cutting means positioned at said back cutting station over the path of movement of said mandrels, and a separator plate positioned in an upright attitude and protruding upwardly between said conveyors in said upright plane, said separator plate extending from adjacent said breast cutting disc to a position beyond said back cutting means, whereby poultry carcasses are mounted at the loading station on the mandrels by positioning the previously eviscerated body cavity of a carcass about a mandrel with the back of the carcass resting on the mandrel and the breast of the carcass suspended below the mandrel, the mandrels carry the carcasses through the breast cutting station where the cutting disc cuts upwardly through the breasts of the carcasses, the cut through the breasts of the carcasses move about the separator plate and the separator plate maintains the breast halves separate as the carcasses move on the mandrels from the breast cutting station to the back cutting station where the back cutting means cuts downwardly through the backs of the carcasses as the separator plate maintains the breast halves separate, and the carcass halves are separately discharged at the delivery station.

2. The apparatus of claim 1 and further including bracket plates positioned on each said conveyor on opposite sides of said upright plane for receiving and holding the breast of a carcass as the carcass is carried by a mandrel and cut apart by said rotary breast cutting disc and said back cutting means.

* * * * *